US010236714B2

(12) United States Patent
Boratyn et al.

(10) Patent No.: US 10,236,714 B2
(45) Date of Patent: Mar. 19, 2019

(54) UPS OPERATION WITH HIGH CONVERTER EFFICIENCY (71) Applicant: ABB Technology AG, Zurich (CH)

(72) Inventors: Arkadiusz Boratyn, Sosnica (PL); Esa-Kai Paatero, Minusio (CH); Rafael Jacukowicz, Cracow (PL)

(73) Assignee: ABB Schweiz AG, Baden (CH)

( * ) Notice: Subject to any disclaimer, the term of this patent is extended or adjusted under 35 U.S.C. 154(b) by 212 days.

(21) Appl. No.: 15/141,351

(22) Filed: Apr. 28, 2016

(65) Prior Publication Data
US 2016/0322862 A1 Nov. 3, 2016

(30) Foreign Application Priority Data

Apr. 30, 2015 (EP) .................................. 15165849

(51) Int. Cl.
H02J 9/00 (2006.01)
H02J 7/00 (2006.01)
(Continued)

(52) U.S. Cl.
CPC ............. *H02J 9/061* (2013.01); *G06F 1/263* (2013.01); *G06F 1/32* (2013.01); *G06F 1/3234* (2013.01);
(Continued)

(58) Field of Classification Search
CPC ....... Y02B 10/72; Y04S 20/12; Y04S 20/248; Y10T 307/615; H02J 9/00; H02J 3/06;
(Continued)

(56) References Cited

U.S. PATENT DOCUMENTS 6,154,381 A * 11/2000 Kajouke ................... B60L 1/00
363/65
7,638,899 B2 12/2009 Tracy et al.
(Continued)

FOREIGN PATENT DOCUMENTS

WO 2010093549 A1 8/2010
WO 2011033820 A1 3/2011
(Continued)

OTHER PUBLICATIONS

European Search Report and Written Opinion, EP15165849, dated Sep. 11, 2015, ABB Technology AG, 6 pages.

*Primary Examiner* — Rexford Barnie
*Assistant Examiner* — Rasem Mourad
(74) *Attorney, Agent, or Firm* — J. Bruce Schelkopf; Taft Stettinius & Hollister LLP (57) ABSTRACT The present invention provides a method for controlling an uninterrupted power supply system comprising multiple converters and a control device, the multiple converters are connected in parallel between a power supply side and a load side of the uninterrupted power supply system, each converter is provided to be individually activated by the control device to provide power from the power supply side to the load side, comprising the steps of determining a system load level at the load side of the uninterruptable power supply system, determining a number of required active converters based on the system load level and a system efficiency depending on the number of active converters, and activating the number of required converters based on the above determination.

16 Claims, 5 Drawing Sheets (51) Int. Cl.
*H02J 9/06* (2006.01)
*G06F 1/26* (2006.01)
*G06F 1/3234* (2019.01)
*G06F 1/32* (2019.01)
*H02J 1/10* (2006.01)
*H02J 3/06* (2006.01)

(52) U.S. Cl.
CPC ............... *H02J 1/102* (2013.01); *H02J 3/06* (2013.01); *H02J 9/062* (2013.01)

(58) Field of Classification Search
CPC ........ H02J 1/102; H02J 307/64–307/66; H02J 9/061; H02J 9/062; G06F 1/263
USPC ...................................................... 307/64–66
See application file for complete search history.

(56) References Cited

U.S. PATENT DOCUMENTS

| | | | |
|---|---|---|---|
| 7,904,734 B1* | 3/2011 | Singla | G06F 1/263 713/300 |
| 9,093,861 B2 | 7/2015 | Nakano et al. | |
| 2009/0115252 A1* | 5/2009 | Caraghiorghiopol | H02J 1/10 307/48 |
| 2009/0217060 A1 | 8/2009 | Tsuchiya | |
| 2010/0067267 A1 | 3/2010 | Jagota | |
| 2010/0244778 A1 | 9/2010 | Chuang et al. | |
| 2012/0026764 A1 | 2/2012 | Giuntini et al. | |
| 2012/0086269 A1* | 4/2012 | Nakano | H02J 9/061 307/23 |
| 2012/0216055 A1* | 8/2012 | Dumas | G06F 1/26 713/320 |
| 2013/0002027 A1* | 1/2013 | Yu | H02J 9/061 307/66 |
| 2013/0119766 A1* | 5/2013 | Hsieh | H02J 9/06 307/64 |
| 2014/0054967 A1 | 2/2014 | Toyoda | |
| 2014/0181544 A1 | 6/2014 | Breen et al. | |
| 2014/0210271 A1 | 7/2014 | Toyoda | |
| 2015/0015074 A1* | 1/2015 | Hou | H02J 1/102 307/65 |
| 2015/0207362 A1* | 7/2015 | Ohnishi | H02J 9/062 307/65 |
| 2015/0305197 A1* | 10/2015 | King | H05K 7/207 361/695 |

FOREIGN PATENT DOCUMENTS

| | | |
|---|---|---|
| WO | 2012169045 A1 | 12/2012 |
| WO | 2012169046 A1 | 12/2012 |

* cited by examiner

UPS OPERATION WITH HIGH CONVERTER EFFICIENCY

TECHNICAL FIELD

The present invention relates to the field of uninterruptable power supply systems (UPS) and a method for control of such a UPS. In particular, the present invention relates to the area of UPS with a 3-phase AC source and have multiple converters, which are typically used in industrial applications.

BACKGROUND ART

It is known in the Art to provide uninterruptable power supply (UPS) systems, which comprise multiple parallel converters. The converters are responsible for converting source power into output power as required for a load. Hence, the converters are typically connected to a primary power source for normal operation and a secondary power source, which powers the load in case of a failure of the primary power source. Primary and secondary source can be any kind of source, which can be provided individually for each converter, or which can be provided commonly for groups of converters or even all converters. Typically, the primary power source is an AC source, and the secondary power source is a DC source.

The typical design of the converter comprises a DC link, which is connected to a first and second input converter unit connected to the primary and secondary power source, respectively, and an output converter unit, which provides the output power as required for the load. Hence, the output converter unit can be a DC/AC-converter or a DC/DC-converter, depending on the type of load.

The implementation of the UPS system with multiple parallel converters has many advantages. Amongst others, some of the advantages of a system design with multiple parallel converters are scalability of the UPS system for varying loads and redundancy of converters in case of failure. Furthermore, depending on the actual load, converters which are not required can be operated in standby or even shut down to reduce energy consumption of the UPS system.

Nevertheless, such UPS systems have system efficiency curves, i.e. system efficiency vs. load level, that depend heavily on load level. At light load for individual UPS the unavoidable base load of having the UPS converters and auxiliary functions just operating can be a reasonable fraction of total losses. In addition, also main circuit losses depend on load, for instance simply on a current squared basis for a resistive load or on a filter current envelope in case of discontinuous to continuous currents.

Installations of UPS systems strive for minimal overall losses in order to reduce operational costs. These costs are not only based on simple cost of electricity of the UPS system, but also includes operational costs for e.g. cooling heat from the losses of the UPS system. Furthermore, depending on the losses, also the entire design of the UPS system can have increased costs, e.g. when the system installation of providing for instance for an increased level of cooling is to be modified.

Energy consumption of the UPS system is nowadays reduced by operating the converter in different operational states. Hence, a system level control of the individual converters of the parallel system enables to operate them either supporting the load or in a 'ready' state, where the converter is actually not supporting a load. Hence, converters in 'ready' state reduce the overall energy consumption of the UPS system. Depending on the implementation of different ready states, the converters can be turned on to support the load in a short time as required.

The criterion for operating individual converters in the different operational states is system load level, which defines the number of individual converters required to support the load. Furthermore, a level of redundancy can be defined. The required number of converters support the load in active state, and the rest of the converters are dormant. The UPS system continuously adapts the number of active converters to any change in load level by adding/removing active UPS.

DISCLOSURE OF INVENTION

It is an object of the present invention to provide a method for controlling an uninterrupted power supply system and an uninterrupted power supply system to perform this method, which enable operation of the uninterrupted power supply system with high efficiency in terms of energy consumption.

This object is achieved by the independent claims. Advantageous embodiments are given in the dependent claims.

In particular, the present invention provides a method for controlling an uninterrupted power supply system comprising multiple converters and a control device, whereby the multiple converters are connected in parallel between a power supply side and a load side of the uninterrupted power supply system, each converter is provided to be individually activated by the control device to provide power from the power supply side to the load side, comprising the steps of determining a system load level at the load side of the uninterruptable power supply system, determining a number of required active converters based on the system load level and a system efficiency depending on the number of active converters, and activating the number of required converters based on the above determination.

The present invention also provides an uninterruptable power supply system comprising multiple converters and a control device, whereby the multiple converters are connected in parallel between a power supply side and a load side of the uninterrupted power supply system, each converter is provided to be individually activated by the control device to provide power from the power supply side to the load side, and the control device performs the above method.

The present invention further provides a software package for upgrading an uninterruptable power supply system, whereby the software package contains instructions for controlling the uninterruptable power supply system to perform the above method.

The basic idea of the invention is to perform an operation of the uninterruptable power supply (UPS) system in a way, that the converters are operated in an operational state with high converter efficiency, i.e. with low losses compared to the overall energy consumption of the converter. With this additional control parameter, losses of the UPS system can be reduced, thereby further facilitating design of the UPS system, i.e. in respect to cooling. Compared to a conventional UPS system, which is controlled in a conventional way, typically an increased number of converters is actively supporting the load for a given system load level, unless load level approximates maximum load level. Furthermore, due to the increased number of converters actively supporting the system load, the UPS system can rapidly react on changes on the load, in particular on an increased power consumption of the load, without activating additional converters. Accordingly, also the number of converters, which are not actively supporting the load, but which are active or in standby, can be reduced. Hence, also power consumption of these converters can be reduced. Since these converters do not actively support the load, the power consumption of these converters completely adds to the losses of the UPS system. The UPS system efficiency can be provided as a system parameter, which is stored in the control device. Nevertheless, the control device can also perform measurements to determine the efficiency of the converters.

As already discussed above, the overall reliability of load support of the inventive method is not at all reduced compared to the state of the art methods.

The system efficiency can be provided as a system parameter, which is stored in the control device. Nevertheless, the control device can also perform measurements to determine the efficiency of the converters.

The above method can be implemented purely in software, in particular firmware of the UPS system, so that no changes in hardware are required. Hence, hardware costs do not increase. Additionally, also existing UPS systems can be easily modifies to implement and perform the above method. Furthermore, flexibility of the UPS system can be increased for operation modes of existing or upcoming installations together with a cost benefit.

According to a modified embodiment of the invention the step of determining a number of required active converters based on the system load level and a system efficiency depending on the number of active converters comprises determining the system efficiency depending on the number of active converters and a known converter efficiency depending on a converter load level. Hence, the converters are operated in an operational state with high converter efficiency, i.e. with low losses compared to the overall energy consumption of the converter. A converter operating at nominal power typically does not operate with highest efficiency. Hence, compared to a conventional UPS system, which is controlled in a conventional way, typically an increased number of converters is actively supporting the load for a given system load level, unless load level approximates maximum load level. Furthermore, due to the increased number of converters actively supporting the system load, the UPS system can rapidly react on changes on the load, in particular on an increased power consumption of the load, without activating additional converters. Accordingly, also the number of converters, which are not actively supporting the load, but which are active or in standby, can be reduced. Hence, also power consumption of these converters can be reduced. Since these converters do not actively support the load, the power consumption of these converters completely adds to the losses of the UPS system. With the converters operated in an efficient way, also the overall UPS system efficiency increases. Hence, the system efficiency is determined depending on the efficiency of the converters. The converter efficiency can be provided as a system parameter, which is stored in the control device. Nevertheless, the control device can also perform measurements to determine the efficiency of the converters.

According to a modified embodiment of the invention the step of determining the system efficiency depending on the number of active converters and a known converter efficiency depending on a converter load level comprises determining the system efficiency depending on the number of active converters and a known converter efficiency depending on a converter load level for each converter individually and determining the system efficiency depending on the efficiency of each individual converter. Hence, the efficiency of each converter can be individually considered. This is in particular important in case different converters with different efficiencies over load are used. Accordingly, the UPS system can be modified e.g. by replacing converters with higher efficiency at a certain load level in case of changes of the load level. Accordingly, the number of active converters can even be unchanged in case of changes of the load level. Nevertheless, the overall system efficiency can be reliably adapted to the current system load level.

In an alternative embodiment, the converter efficiency is determined for all converters depending on a converter load level, thereby assuming that all converters have a similar curve of efficiency versus load. This is in particular useful for implementation of a simple control in the control device. Hence, the efficiency of a converter is approximated by this curve. This is in particular suitable when only one identical type of converters is used in the UPS system.

According to a modified embodiment of the invention the step of determining the system efficiency depending on the number of active converters and a known converter efficiency depending on a converter load level comprises the steps of determining based on the system load level and the number of active converters a system efficiency determining based on the system load level and the number of active converters a system efficiency when one converter is removed and/or when one converter is added, determining a highest system efficiency from the determined system efficiency based on the number of active converters as well as the number of active converters when one converter is added and/or when one converter is removed, and the step of determining a number of required active converters based on the system load level and a system efficiency depending on the number of active converters comprises selecting the number of active converters with the highest system efficiency. Hence, the control device compares the overall system efficiency of the UPS system based on the number of currently active converters and additionally based on this number with variations upwards and downwards. Hence, in case the overall system efficiency of the UPS system based on the number of currently active converters is lower than for an increased or decreased number of converters, the number of currently active converters is changed to obtain an increased overall system efficiency.

According to a modified embodiment of the invention the method comprises the additional step of providing an efficiency curve or efficiency table for the converters, and the step of determining based on the system load level and the number of active converters a system efficiency comprises identifying a point of operation on the efficiency curve or the efficiency table and the converter efficiency of this point of operation. This provides a simple means for identifying the highest converter efficiency. The detail level can be adapted by the resolution of the efficiency curve or the efficiency table. Depending on t number of converters of the UPS system, a higher or lower detail level can be suitable. Preferably, the higher the number of converters, the higher the resolution of the efficiency curve or the efficiency table. The table can be implemented as a look-up table.

According to a modified embodiment of the invention the step of selecting the number of active converters with the highest system efficiency comprises comparing the highest system efficiency with a current system efficiency, and selecting the number of active converters with the highest system efficiency in case the highest system efficiency is superior to the current system efficiency together with a pre-defined threshold value. The use of the threshold adds stability to the UPS system and avoids frequent modification of the number of active converters, in particular when the overall system efficiency is almost equal for different numbers of active converters. Hence, a minimum system efficiency gain is needed to add or remove a converter. The threshold value defines a minimum threshold, which has to be exceeded in order to modify the configuration of the UPS system, i.e. to modify the number of active converters. Preferably, the threshold is a user defined value, which is further preferred based on system characteristics of the UPS system.

According to a modified embodiment of the invention the step of selecting the number of active converters with the highest system efficiency comprises defining a load band for the system load, and selecting the number of active converters with the highest system efficiency in case the system load is out of the load band. At least for a given configuration of the UPS system, i.e. a UPS system with a given number of converters, the system efficiency can be determined based on the load for different configuration, i.e. for different number of active converters. This is in particular valid in case the converters are identical or have at least an almost identical efficiency curve. Hence, depending on the load, the number of active converters can be easily determined. Furthermore, with the defined load band, stability can be added to the UPS system and frequent modification of the number of active converters can be avoided, in particular when the overall system efficiency is almost equal for different numbers of active converters. The load band width without addition or removal of a converter is preferably a set of at least one non-zero value based on system characteristics and can further preferred by set by a user.

According to a modified embodiment of the invention the step of determining a number of required active converters based on the system load level and a system efficiency depending on the number of active converters comprises determining the number of required active converters under additional consideration of a mode of operation of the UPS system and a level of redundancy. These settings depend e.g. on a desired response time in case of load changes or failure of an active converter, so that replacement is required. This can be easily achieved by a converter, which is active but not supporting the load, so that this converter can support the load within a very short response time. Hence, an active converter not contributing to load support adds idle losses. The setting are typically to be defined by a user. Additionally, the converters, which are not active, can be in different states of readiness depending on required response times, for instance with their DC link and/or energy storage available but the internal converters units partly or wholly turned off, so that they can be activated upon a trigger signal.

According to a modified embodiment of the invention the mode of operation comprises a double conversion mode, also referred to as active mode, where a converter is fully operational, and a line interactive mode, where the load is supported by turning a load current that might contain harmonics into a utility current/source current with reduced harmonics. Hence, these modes can be selected as required to perform additional optimization of the operation of the UPS system.

According to a modified embodiment of the invention the method comprises the step of maintaining converters, which are not active, in varying states of readiness based on activation times and effect on overall efficiency, whereby the converters maintain a system communication level to receive commands to change their operational state from an active state to a de-activated state with the different states of readiness and vice versa. The control device typically sends the command to the respective converters. Each converter, which is not active, adds some losses based on its state of readiness. Nevertheless, requirements different from the overall system efficiency can make it necessary to operate converters in different states of readiness. Nevertheless, also the different states of readiness can be considered when calculating the overall system efficiency. In particular, the load level of the active converters enables a load margin, which can easily and rapidly be provided to the load, so that also the number of de-activated converters in the different states of readiness can be adapted under consideration of this margin. The same refers to the number of active converters not contributing to load support.

According to a modified embodiment of the invention the step of maintaining converters, which are not active, in varying states of readiness comprises maintaining converters, which are not active, connected to the power supply side and the load side, whereby the converter is energized and at least partially activated but not contributing to provide power at the load side, maintaining converters, which are not active, connected to the power supply side and the load side, whereby the converter is energized but deactivated, and maintaining converters, which are not active, connected to the power supply side and the load side, whereby the converter is not energized. Hence, depending on the state of readiness, the converter can be activated with a short or increased response time, so that the control device can sufficiently fast activate the converter parallel to the other active converters on a time scale that is acceptable by the load, typically less than a half cycle or 10 ms. The state of readiness can be determined by system or converter response times, required level of redundancy, known load behavior, level of quiescent losses of varying states of readiness.

BRIEF DESCRIPTION OF DRAWINGS

These and other aspects of the invention will be apparent from and elucidated with reference to the embodiments described hereinafter.

In the drawings.

DETAILED DESCRIPTION OF THE INVENTION

Figure 1:
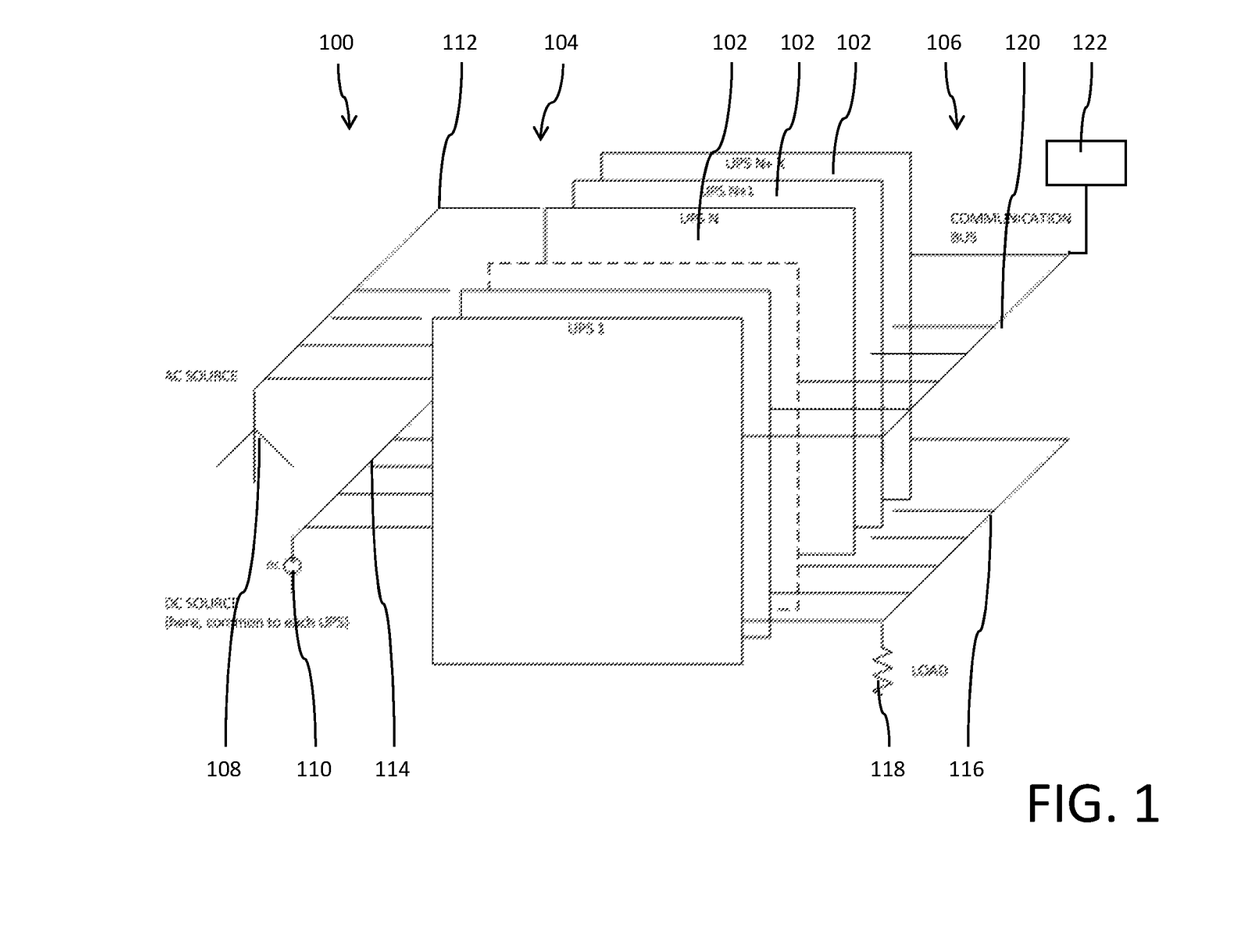
FIG. 1 shows a typical setup of an UPS system according to a first embodiment with multiple parallel converters as a schematic drawing.

FIG. 1 shows a typical setup of an uninterruptable power supply (UPS) system 100 according to a first, preferred embodiment. The UPS system 100 comprises multiple parallel converters 102, which are connected in parallel between a power supply side 104 and a load side 106 of the UPS system 100.

On the power supply side 104, the UPS system 100 comprises an AC source 108 as primary source and a DC source 110 as secondary source, which are connected via an AC power bus 112 and a DC power bus 114, respectively, to the converters 102 in parallel. In an alternative embodiment, multiple AC sources 108 and/or multiple DC sources 110 are connected to the AC power bus 112 and the DC power bus 114, respectively.

On the load side 106, the UPS system 100 is connected via an output power bus 116 to a load 118. Furthermore, the converters 102 are connected via communication bus 120 to a control device 122. Although the communication bus 120 is shown on the load side 106, it is to be noted that the communication bus 120 is independent from the load side 106 or the power supply side 104. Each converter 102 can be individually activated, de-activated or set in any mode of operation by the control device 122 upon respective communication via the communication bus 120.

Figure 2:
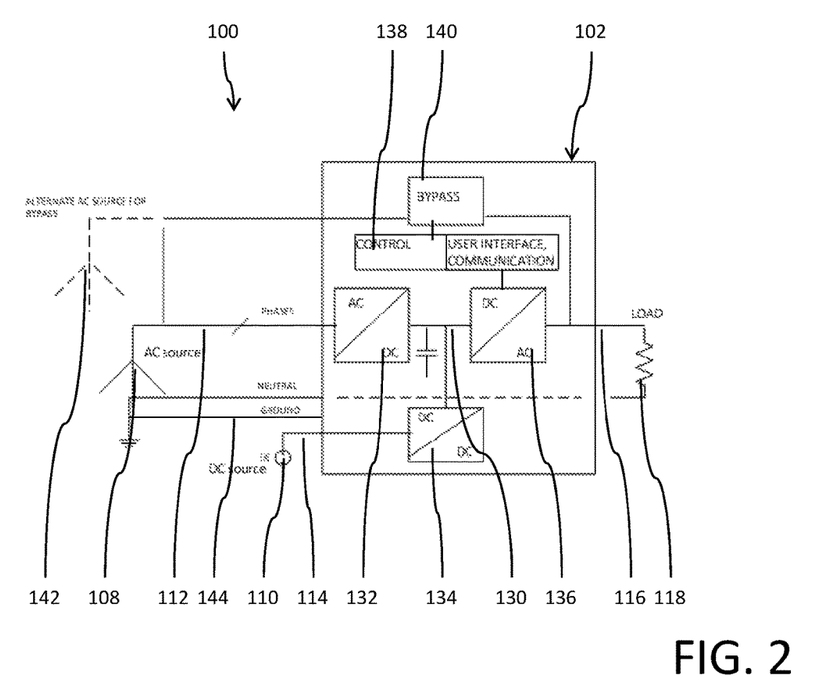
FIG. 2 shows a detailed view of the UPS system according to the first embodiment, where the setup of a converter is shown in detail, whereby only one converter is shown by way of example, as a schematic drawing.

Each converter 102 has an identical setup. Nevertheless, in alternative embodiments, the converters 102 may be provided with different properties. Each converter 102 comprises a DC link 130, which is connected at the power supply side 104 to a first and second input converter unit 132, 134. The first and second input converter unit 132, 134 are connected via AC power bus 112 and DC power bus 114 to the AC source 108 and the DC source 110, respectively. Hence, the first input converter unit 132 is a AC/DC converter unit, and the second input converter unit 134 is a DC/DC converter unit. On the load side 106, the DC link 130 is connected to an output converter unit 136, which provides the output power as required for the load 118. Hence, the output converter unit 136 can be a DC/AC-converter or a DC/DC-converter, depending on the type of load 136. The output converter unit 136 is connected via output power bus 116 to the load 118. The output converter unit 136 is a DC/DC converter unit in this embodiment.

Each converter further comprises a control unit 138 for controlling the operation of the converter units 132, 134, 136, and which receives commands from the control device 122 via communication bus 120.

Still further, the converter comprises a bypass unit 140, which enables a bypass of the converter units 132, 134, 136 and the DC link 130 in case of load failure. Hence, the bypass unit 140 is activated in an overload or fault clear situation exceeding the converter current source capability, e.g. to achieve fuse blow at the load side. The bypass unit 140 is connected to the output power bus 116 and the AC source 108. In an alternative embodiment, the bypass unit 140 is connected to a bypass AC source 142, as indicated in FIG. 2.

Furthermore, as can be seen in FIG. 2, a common reference 144 is provided for the converters 102, which is neutral of the AC source 108 in this embodiment.

Figure 3:
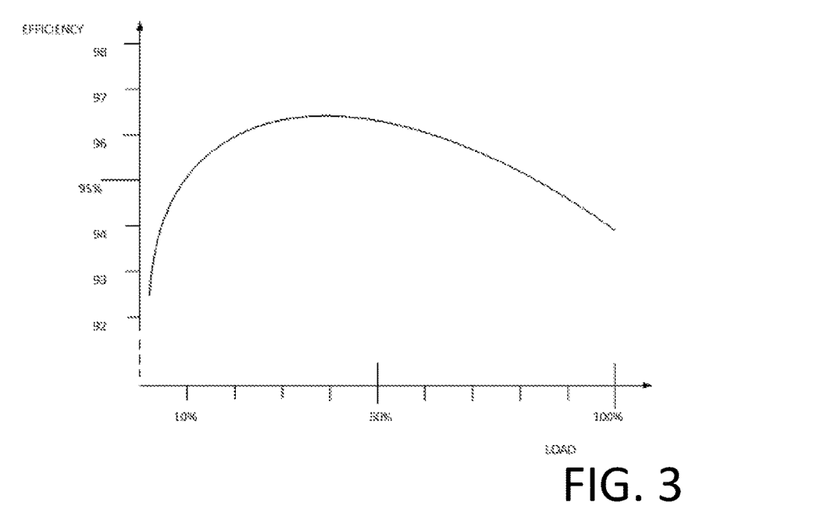
FIG. 3 shows a curve indicating efficiency over load level for a single converter.

FIG. 3 shows an efficiency curve indicating efficiency over load level for a single converter 102. This efficiency curve is stored in the control device 122 for all different converters 102. As can be seen in FIG. 3, a converter 102 operating at nominal power typically does not operate with highest efficiency. Highest efficiency is in this example efficiency curve obtained for a load level of approximately 40% and decreasing for higher and lower load levels. As can be seen in FIG. 3, converter efficiency is poor at low load levels, as a base load formed of system functions that are not load dependent, forms a large fraction of total losses. As load increases efficiency improves as other losses e.g. resistive and eddy currents, e.g. based on inductors, are still minor but power is delivered to the load 118. Efficiency typically reduces as system hardware passes beyond optimum cost effective point of operation, e.g. due to wire cross section for resistive losses.

The detail level of the efficiency curve is chosen depending on the number of converters 102 of the UPS system 100. The higher the number of converters 102, the higher the resolution of the efficiency curve. In this embodiment, the efficiency of the converter 102 is provided as a system parameter, which is stored in the control device 122. Hence, the efficiency curve shown in FIG. 3 is stored in the control device 122. The efficiency curve may vary even for converters 102 having a similar or identical setup with different parameter.

Figure 8:
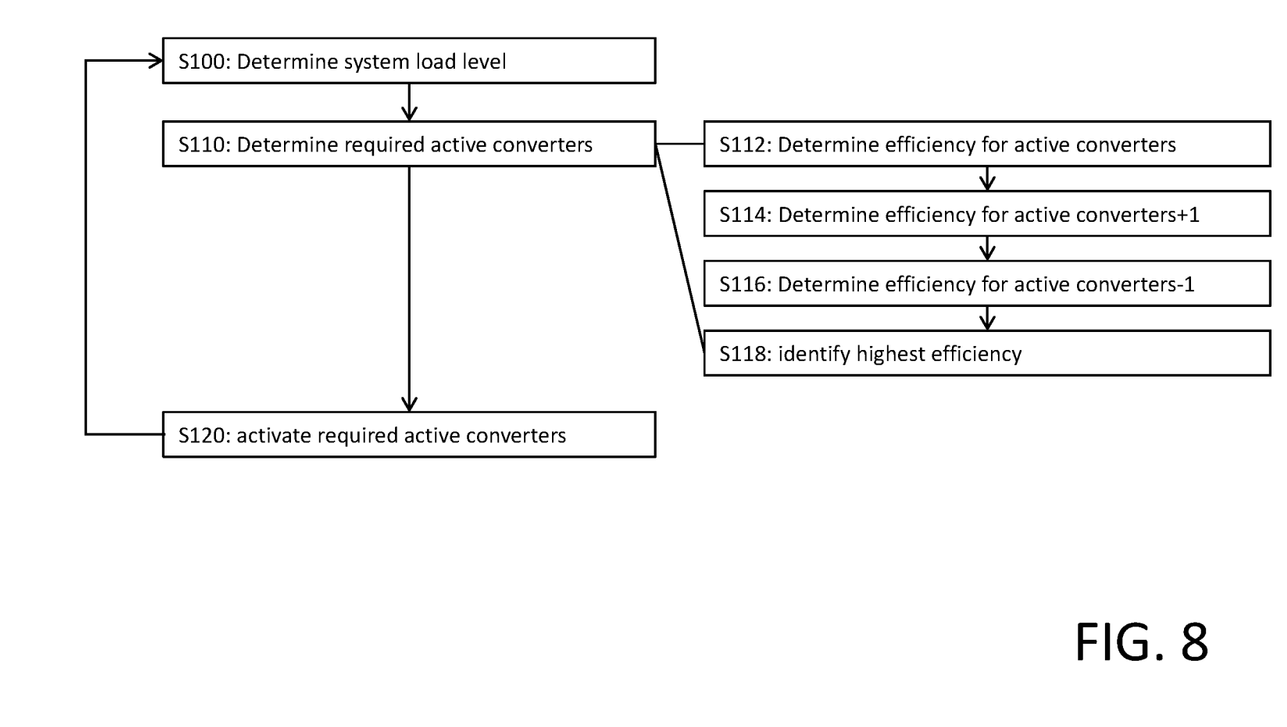
FIG. 8 shows a flow chart illustrating the inventive method performed in accordance with the UPS system of the first embodiment.

Subsequently will be described a method of control of the UPS system 100 according to the preferred embodiment with respect to FIG. 8. The method is implemented in software, in particular firmware of the UPS system, which is executed on the control device 122. In case required, some steps of the method may be implemented in the control units 138 of the converters 102.

In step S100, a system load level at the load side 106 of the UPS system 100 is determined. The system load levels depends on the current power consumption of the load 118.

In step S110, a number of required active converters 102 is determined based on the system load level and a system efficiency depending on the number of active converters 102. Hence, in step S112, the load level is determined for the number of active converters 102 and the efficiency of all active converters 102 is determined. In particular, the load level of each converter 102 is compared to the efficiency curve of FIG. 3 to determine the efficiency of the converters 102, whereby a point of operation on the efficiency curve is identified and the converter efficiency is determined as the converter efficiency at this point of operation. The overall system efficiency is calculated based on the efficiency of the converters 102.

In an alternative embodiment, the converter efficiency depending on the converter load level is determined for each converter 102 individually based on an individual efficiency curve.

In step S114, the above step 112 is repeated, whereby the calculation is based on the assumption of the number of active converters 102 is increased by one. Hence, a system efficiency is determined based on the system load level and the number of active converters 102 plus one, whereby the system load level is used as basis for distributing load power to the assumed active converters 102 and calculating the efficiency for each converter 102. Based on the this calculation, the overall system efficiency is determined.

In step S116, the above step 112 is repeated, whereby the calculation is based on the assumption of the number of active converters 102 is decreased by one. Hence, a system efficiency is determined based on the system load level and the number of active converters 102 minus one, whereby the system load level is used as basis for distributing load power to the assumed active converters 102 and calculating the efficiency for each converter 102. Based on the this calculation, the overall system efficiency is determined.

In step S118, a number of required active converters 102 is determined based on the above determinations of the overall system efficiency for the number of active converters 102 comprises comparing the overall system efficiency for the number of active converters 102 with the overall system efficiency for the number of active converters 102 plus one and the overall system efficiency for the number of active converters 102 minus one. The number of active converters 102 is set to the value providing the highest system efficiency in case the highest system efficiency is superior to the current system efficiency together with a pre-defined threshold value. The threshold value defines a minimum threshold, which has to be exceeded in order to modify the configuration of the UPS system 100, i.e. to modify the number of active converters 102. The threshold is a user defined value based on system characteristics of the UPS system 100.

In an alternative embodiment, in step S110, a load band for the system load is defined, and the number of active converters 102 with the highest system efficiency is modified in case the system load is out of the load band. For a given configuration of the UPS system 100 with a given number of converters 1002, the system efficiency can be determined based on the load for different configurations, i.e. for different number of active converters 102. Hence, depending on the load level, the number of active converters 102 is directly determined.

Figure 4:
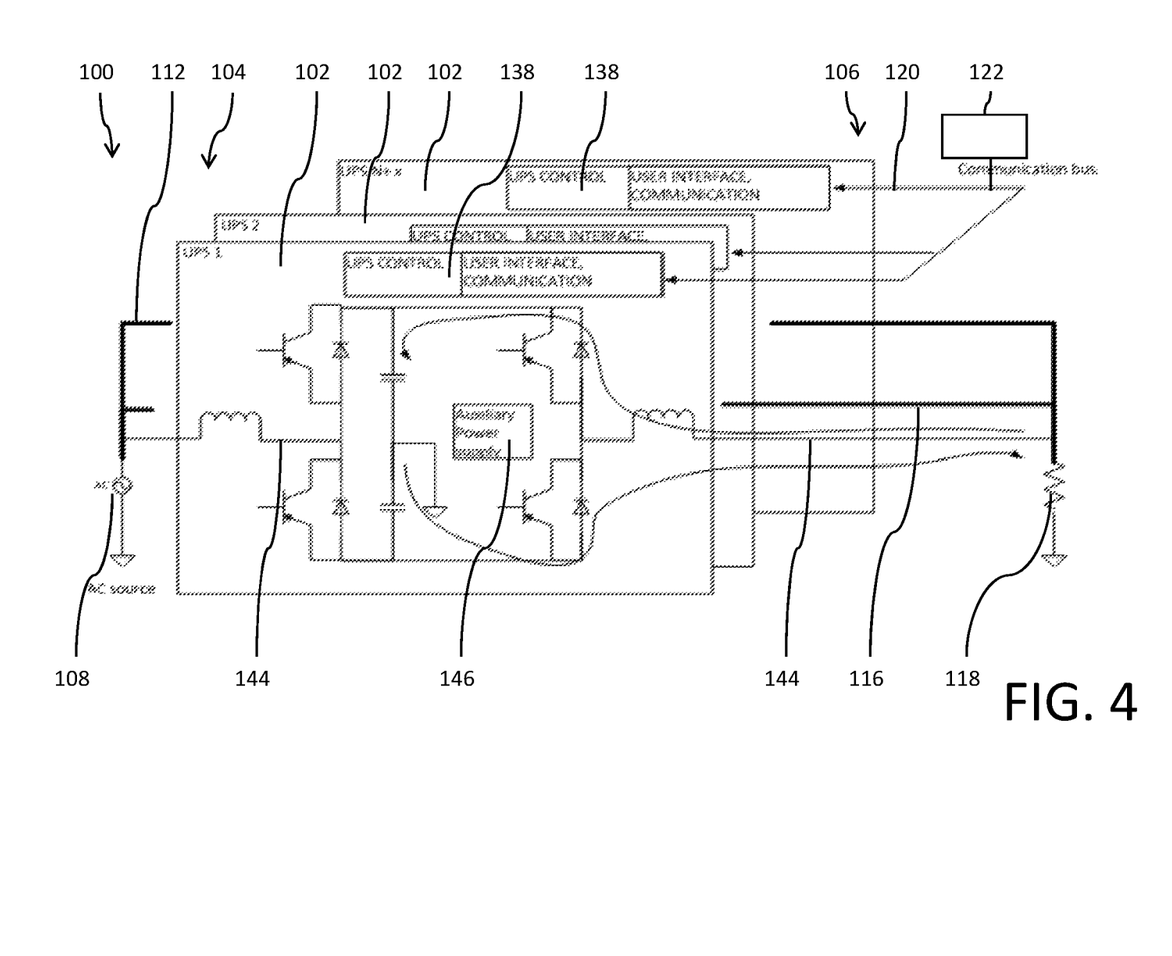
FIG. 4 shows a simplified UPS system according to the first embodiment with converters in different states.

In step S120, the number of required converters 102 based on the above determination is activated. The method the returns to step S100 to continuously monitor the system load level and run the UPS system at maximum efficiency. As can be seen in FIG. 4, which depicts the UPS system of FIG. 1 in a simplified way without showing the DC source 110, the DC power bus 114 and the bypass unit 140, by way of example, the UPS system 100 has a two sided DC link 130 centered on AC source neutral and load reference. Other configurations are not precluded. In this example, converters 102 connected to the AC power bus 112 and the output power bus 116 with bold connections, marked as UPS 2 . . . UPS N+x, contribute to load support. The converter 102 shown on top of FIG. 4, which is marked as UPS 1, is not contributing to load support.

In a modified embodiment, the step S110 further includes determining the number of required active converters 102 under additional consideration of a mode of operation of the UPS system 100 and a level of redundancy. These settings are user settings and depend e.g. on a desired response time in case of load changes or failure of an active converter 102, so that replacement is required. Hence, additional converters can be activated without supporting the load 118, thereby contributing to idle losses.

The mode of operation comprises a double conversion mode, also referred to as active mode, where a converter 102 is fully operational, and a line interactive mode, where the load 118 is supported by turning a load current that might contain harmonics, into a utility current/source current with reduced harmonics. These modes are selected as required to perform additional optimization of the operation of the UPS system 100.

In a further modified embodiment, converters 102, which are not active, are kept in different states of readiness depending on required response times, so that the converters 102 can be activated e.g. upon a trigger signal and add different losses to the overall system efficiency. The varying states of readiness imply different activation times and different effects on overall efficiency. In any case, the converters 102 maintain a system communication level to receive commands from the control device 118 to change their operational state from an active state to a de-activated state with the different states of readiness and vice versa.

Maintaining converters 102, which are not active, in varying states of readiness comprises maintaining converters 102, which are not active, connected to the power supply side 104 and the load side 106, whereby the converter 102 is energized and at least partially activated but not contributing to provide power at the load side 106, maintaining converters 102, which are not active, connected to the power supply side 104 and the load side 106, whereby the converter 102 is energized but deactivated, and maintaining converters 102, which are not active, connected to the power supply side 104 and the load side 106, whereby the converter 102 is not energized. Depending on the state of readiness, the converters 102 can be activated with a short or increased response time, so that the control device 122 can sufficiently fast activate the converters 102 parallel to the other active converters 102 on a time scale that is acceptable by the load 118, typically less than a half cycle or 10 ms. The state of readiness is determined by UPS system 100 or converter 102 response times, required level of redundancy, known behavior of the load 118, and a level of quiescent losses of varying states of readiness.

Figure 5:
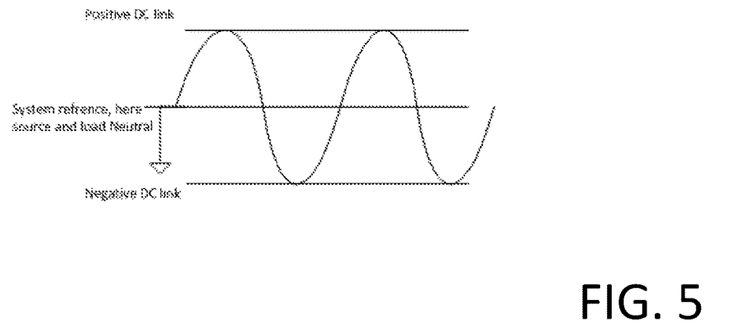
FIG. 5 shows a converter time diagram in a first state of readiness.

According to FIG. 5, a converter 102 not contributing to load support is connected to AC source 108 and load 118, but none of the converter units 132, 134, 136 is powered on. The DC link 130 is maintained at peak value of AC from the AC source 108 from the load side 106 through anti-parallel/free wheel diodes of controlled switches of the output converter unit 136. Hence, a current path through the output converter unit 136, which is depicted in FIG. 4 for the converter numbered UPS 1, is formed.

In this state, source of losses is an auxiliary power supply 146 of the converter 102 supporting communication and control of the converter 102, in particular supporting the control unit 138, which is needed to maintain readiness of the converter 102 to turn the converter 102 on. A response of the converter 102 can be achieved within the order of milliseconds. In this configuration, the load 118 may see a minor transient when first input converter unit 132 and the output converter unit 136 are turned on. This occurs since the output converter unit, which typically comprises a buck type converter/inverter, needs some headroom between voltage level of the DC link 130 and instantaneous output voltage to maintain proper regulation. The response of the first converter unit 132 usually is in the order of a few milliseconds to bring links to regulation with the required head room.

Figure 6:
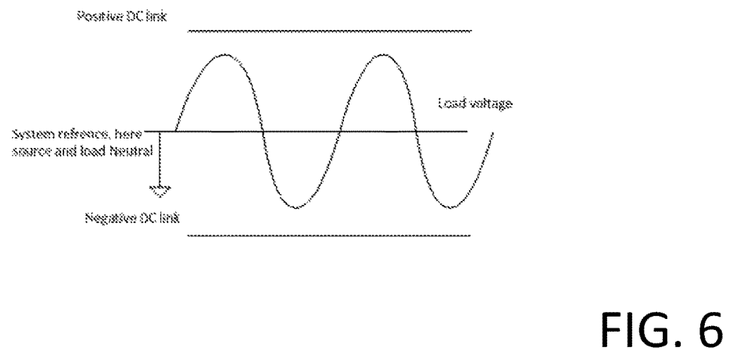
FIG. 6 shows a converter time diagram in a second state of readiness.

A converter 102 not contributing to load support is also discussed with reference to FIG. 6. The converter 102 is connected to the AC source 108 and the load 118 and the first converter unit 132 is on to maintain the DC link 130 at proper normal operation levels. Alternatively, the output converter unit 136 can maintain the DC link 130 from load side 106.

Losses are slightly higher than in the state discussed with reference to FIG. 5, as the losses of the first converter unit 132 or the output converter unit 136 at very low load, when only the auxiliary functions as discussed with reference to FIG. 5 are supported, have to be added compared to the state discussed with reference to FIG. 5. The first converter unit 132 may operate in bursts to minimize losses, thereby maintaining head room for the output converter unit 136. In this operational state, a response of the converter 102 can be achieved in the order of milliseconds. In this operational state, the load 118 will see practically no transient as output converter unit 136 has sufficient head room between link and output voltage to operate properly at the moment when turned on.

Figure 7:
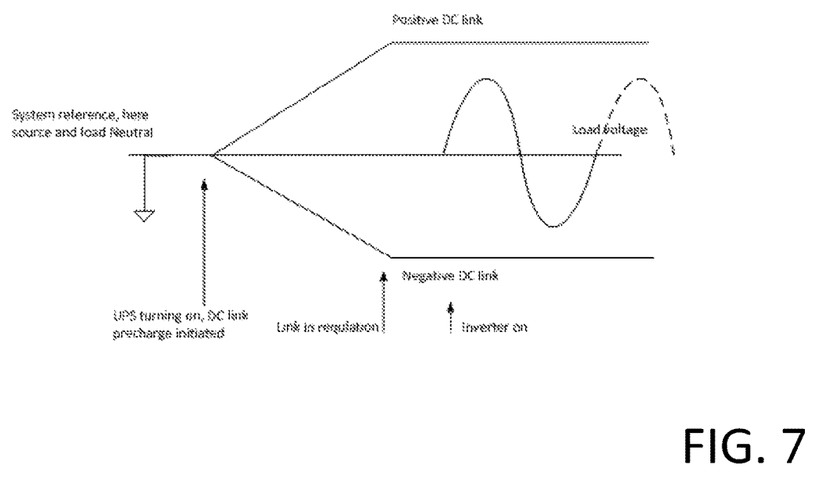
FIG. 7 shows a converter time diagram in a third state of readiness.

According to FIG. 7, a converter 102 not contributing to load support is connected to AC source 108 and load 118, but none of the converter units 132, 134, 136 is powered on. The DC link 130 is down. Auxiliary power supply 146 supports control and communication as previously discussed. Response to turn on command from the control device 122 is slow as the DC link has to be pre-charged before the output converter unit 136 can be turned on. The response time is of the order of seconds. However, losses in this operational state are minimal so the mode can be chosen when a high level of redundancy is provided by the UPS system 100, so that unexpected power on of converters 102 is not likely.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST

100 uninterruptable power supply (UPS) system
102 converter
104 power supply side
106 load side
108 AC source
110 DC source
112 AC power bus
114 DC power bus
116 output power bus
118 load
120 communication bus
122 control device
130 DC link
132 first input converter unit
134 second input converter unit
136 output converter unit
138 control unit
140 bypass unit
142 bypass AC source
144 common reference
146 auxiliary power supply

The invention claimed is:

1. Method for controlling an uninterrupted power supply system comprising multiple converters and a control device, whereby the multiple converters are connected in parallel between a power supply side and a load side of the uninterrupted power supply system, each converter is provided to be individually activated by the control device to provide power from the power supply side to the load side, comprising the steps of
    determining a system load level at the load side of the uninterruptable power supply system,
    determining a number of required active converters based on the system load level and a system efficiency depending on the number of active converters, comprising determining the system efficiency depending on the number of active converters and a known converter efficiency depending on a converter load level, and comprising selecting the number of active converters with the highest system efficiency,
    the system efficiency being determined by the steps of
    determining based on the system load level and the number of active converters a system efficiency,
    determining based on the system load level and the number of active converters a system efficiency when one converter is removed and/or when one converter is added, and
    determining a highest system efficiency from the determined system efficiency based on the number of active converters as well as the number of active converters when one converter is added and/or when one converter is removed, and
    selecting the number of active converters with the highest system efficiency comprising comparing the highest system efficiency with a current system efficiency, and selecting the number of active converters with the highest system efficiency when the highest system efficiency is superior to the current system efficiency together with a pre-defined threshold value comprising a minimum system efficiency gain, and
    activating the number of required converters based on the above determination.

2. Method according to claim 1, wherein the step of determining the system efficiency depending on the number of active converters and a known converter efficiency depending on a converter load level comprises determining the system efficiency depending on the number of active converters and a known converter efficiency depending on a converter load level for each converter individually and determining the system efficiency depending on the efficiency of each individual converter.

3. Method according to claim 1, wherein the method comprises the additional step of providing an efficiency curve or efficiency table for the converters, and
the step of determining based on the system load level and the number of active converters a system efficiency comprises identifying a point of operation on the efficiency curve or the efficiency table and the converter efficiency of this point of operation.

4. Method according to claim 1, wherein the step of selecting the number of active converters with the highest system efficiency comprises defining a load band for the system load, and selecting the number of active converters with the highest system efficiency in case the system load is out of the load band.

5. Method according to claim 1, wherein the step of determining a number of required active converters based on the system load level and a system efficiency depending on the number of active converters comprises determining the number of required active converters under additional consideration of a mode of operation of the UPS system and a level of redundancy.

6. Method according to preceding claim 5, wherein the mode of operation comprises a double conversion mode, also referred to as active mode, where a converter is fully operational, and a line interactive mode, where the load is supported by turning a load current that might contain harmonics into a utility current/source current with reduced harmonics.

7. Method according to claim 1, wherein the method comprises the step of maintaining converters, which are not active, in varying states of readiness based on activation times and effect on overall efficiency, whereby the converters maintain a system communication level to receive commands to change their operational state from an active state to a de-activated state with the different states of readiness and vice versa.

8. Method according to preceding claim 7, wherein the step of maintaining converters, which are not active, in varying states of readiness comprises:
maintaining converters, which are not active, connected to the power supply side and the load side, whereby the converter is energized and at least partially activated but not contributing to provide power at the load side,
maintaining converters, which are not active, connected to the power supply side and the load side, whereby the converter is energized but deactivated, and
maintaining converters, which are not active, connected to the power supply side and the load side, whereby the converter is not energized.

9. Method according to claim 2, wherein the step of determining a number of required active converters based on the system load level and a system efficiency depending on the number of active converters comprises determining the number of required active converters under additional consideration of a mode of operation of the UPS system and a level of redundancy.

10. Method according to claim 3, wherein the step of determining a number of required active converters based on the system load level and a system efficiency depending on the number of active converters comprises determining the number of required active converters under additional consideration of a mode of operation of the UPS system and a level of redundancy.

11. Method according to claim 4, wherein the step of determining a number of required active converters based on the system load level and a system efficiency depending on the number of active converters comprises determining the number of required active converters under additional consideration of a mode of operation of the UPS system and a level of redundancy.

12. Method according to claim 2, wherein the method comprises the step of maintaining converters, which are not active, in varying states of readiness based on activation times and effect on overall efficiency, whereby the converters maintain a system communication level to receive commands to change their operational state from an active state to a de-activated state with the different states of readiness and vice versa.

13. Method according to claim 3, wherein the method comprises the step of maintaining converters, which are not active, in varying states of readiness based on activation times and effect on overall efficiency, whereby the converters maintain a system communication level to receive commands to change their operational state from an active state to a de-activated state with the different states of readiness and vice versa.

14. Method according to claim 4, wherein the method comprises the step of maintaining converters, which are not active, in varying states of readiness based on activation times and effect on overall efficiency, whereby the converters maintain a system communication level to receive commands to change their operational state from an active state to a de-activated state with the different states of readiness and vice versa.

15. Method according to claim 5, wherein the method comprises the step of maintaining converters, which are not active, in varying states of readiness based on activation times and effect on overall efficiency, whereby the converters maintain a system communication level to receive commands to change their operational state from an active state to a de-activated state with the different states of readiness and vice versa.

16. Method according to claim 6, wherein the method comprises the step of maintaining converters, which are not active, in varying states of readiness based on activation times and effect on overall efficiency, whereby the converters maintain a system communication level to receive commands to change their operational state from an active state to a de-activated state with the different states of readiness and vice versa.

* * * * *